March 17, 1964  A. E. KRUEGER  3,125,371
CIRCUIT CONTROLLER
Filed Nov. 27, 1961
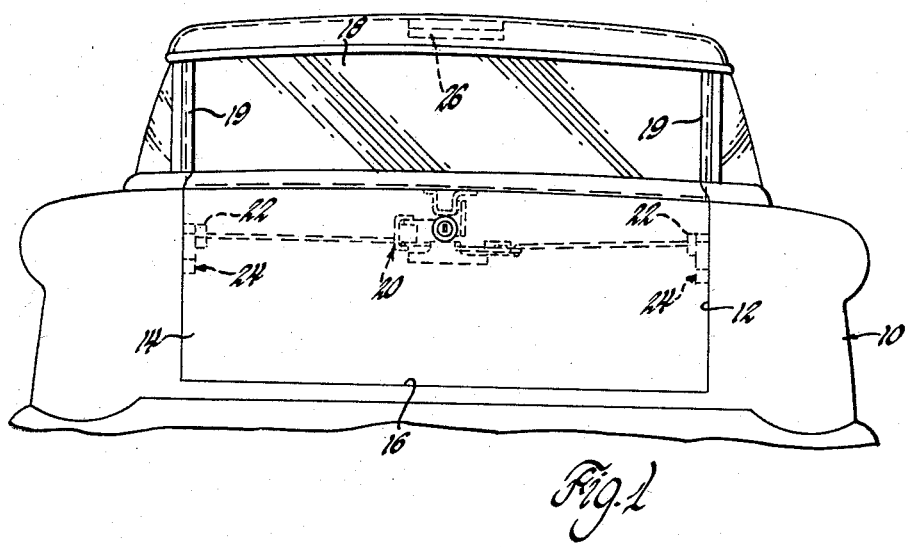
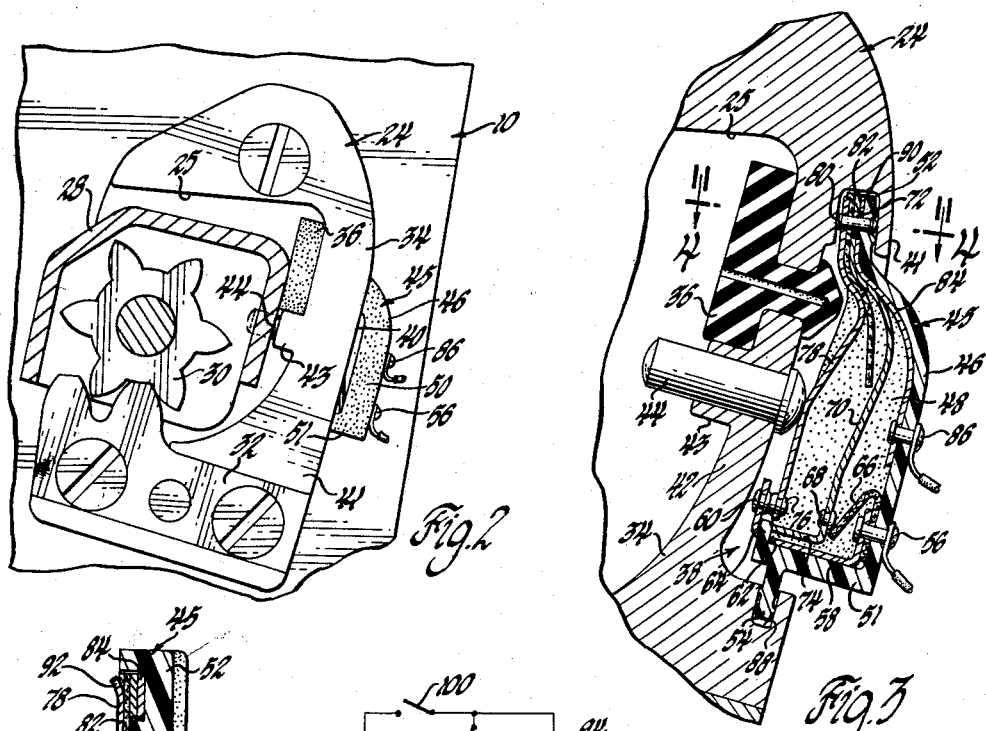
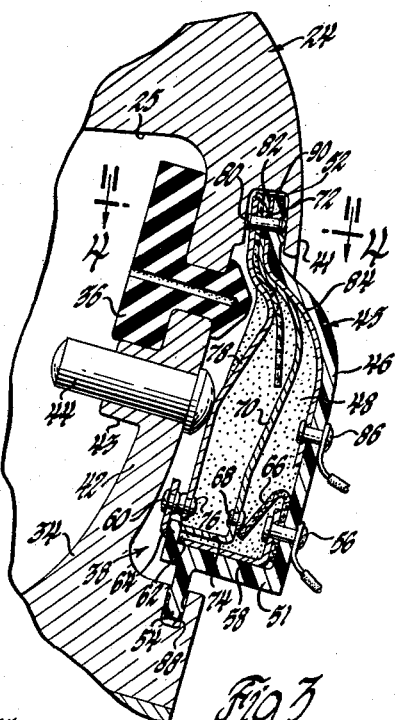
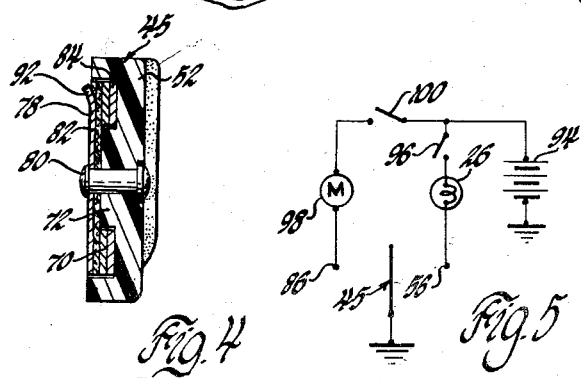
INVENTOR.
Alfred E. Krueger
BY
Herbert Freeman
ATTORNEY

United States Patent Office 3,125,371
Patented Mar. 17, 1964

1

3,125,371
CIRCUIT CONTROLLER
Alfred E. Krueger, 15862 Linnhurst, Detroit 5, Mich.
Filed Nov. 27, 1961, Ser. No. 155,158
7 Claims. (Cl. 296—44)

This invention relates to circuit controllers and more particularly to a selector switch for selectively and alternately enabling and disabling a selected one of a plurality of circuits in accordance with the position of a vehicle closure.

The switch of this invention is particularly adapted for use with power operated station wagon tail gate windows and courtesy lights wherein it is desired to have the courtesy light circuit and the power operating means circuit selectively and alternately enabled by a selector switch controlled by the position of the tail gate. When the tail gate is in an open position, the selector switch enables the courtesy light circuit, and when the tail gate is in a closed position, the switch enables the power operating means circuit. The switch is intended to be mounted in the lock striker and is actuated by a switch plunger controlled by the latch bolt housing.

The primary object of this invention is to provide a new and improved circuit controller. Another object of this invention is to provide a new and improved selector switch for selectively enabling and disabling a circuit in accordance with the position of a vehicle closure. A further object of this invention is to provide a new and improved selector switch for selectively and alternately enabling and disabling a selected one of a plurality of circuits in accordance with a position of a vehicle closure. Yet, another object of this invention is to provide a vehicle body having a courtesy light, a closure movable between open and closed positions and including a power operated window, and a selector switch controlled by the position of the closure and selectively and alternately enabling and disabling the circuits for the window power operating means and for the courtesy light.

These and other objects of the invention will be readily apparent from the following specification and drawings wherein:

FIGURE 1 is a partial rear elevational view of a vehicle body having a courtesy light, and a tail gate mounted thereon for movement between open and closed position and including a power operated window;

FIGURE 2 is an enlarged view of a portion of FIGURE 1;

FIGURE 3 is an enlarged partially broken away view of FIGURE 2;

FIGURE 4 is an enlarged sectional view taken generally along the plane indicated by line 4—4 of FIGURE 3, and, FIGURE 5 is a circuit diagram.

Referring now particularly to FIGURE 1 of the drawings, a station wagon body 10 includes a rear opening 12, the lower half of which is opened and closed by a tail gate 14 swingably mounted adjacent its lower edge 16 on the body 10 by suitable hinge means for movement between a closed position, as shown, and an open position, not shown.

The upper portion of opening 12 is opened and closed by a vertically movable window 18 which is mounted on the tail gate 14 for movement between a closed position,

2 as shown, wherein the side edge portions of the window are received within channel guides 19, and an open position, not shown, wherein window 18 is located within tail gate 14, so that the tail gate can be moved to open position. Window 18 is moved between its open and closed positions by conventional power operated window regulator means including an electric motor. Suitable latch means 20 are provided to latch the tail gate 14 to the body 10 in the closed position thereof, with the latch means including a pair of like conventional rotary bolt side latches 22 mounted on tail gate 14 and a pair of strikers 24, of like construction, except as hereinafter specified, mounted on the body pillars defining the lower side walls of the opening 12. Body 10 also includes a courtesy or dome light 26.

Referring now to FIGURES 2, 3 and 4 of the drawings, each striker 24 is generally C-shaped, including a bolt receiving recess 25 adapted to receive the latch bolt housing 28 and latch bolt 30 in the closed position of the tail gate 14, with the tail gate being held in this position by the detented bolts 30 engaging toothed members 32 of the strikers. The vertical leg 34 of each striker mounts a rubber bumper 36, as will be described, which engages the bolt housing 28 in the latched position of the bolt. A rearwardly opening recess 38 in each leg 34 is defined by a front wall 40, an outside wall 41, and an inside wall 42, with wall 42 being apertured to receive the mounting button of bumper 36. The wall 41 of the left-hand striker, as viewed in FIGURE 1, is cut away, so that the recess 38 thereof opens to the side thereof as well as rearwardly, and the wall 42 of this one striker is further apertured and provided with boss 43 so as to slidably mount a headed switch plunger 44.

A circuit controller or selector switch 45 according to this invention is adapted to be mounted in the recess 38 of the one striker and generally includes a plastic housing having a side wall 46, a rear wall 48, an opposite partial front wall 50, a lower wall 51, and a pair of mounting flanges 52 and 54.

A contact 56 is riveted to wall 46 and also to one leg of a generally U-shaped connector strip 58, the other leg of which mounts a contact 60. Strip 58 is slotted at 62 to receive a lug 64 of wall 51 therethrough. A return bent strip 66 of insulation material overlies contact 56 to prevent engagement between this contact and a contact 68 mounted on a switch arm 70 adjacent the free end thereof. The mounting end of arm 70 is apertured and is received on an apertured lug 72 of flange 52. The free end of arm 70 includes an angular flange 74 which normally engages the lug 64 under the bias of the arm to limit movement of the arm in a direction toward the left as viewed in FIGURE 3, and maintains the contact 68 out of engagement with a contact 76 mounted adjacent the free end of a spring arm 78. The mounting end of arm 78 is secured to flange 52 by a rivet 80 extending through lug 72, with this rivet also securing to flange 52 the arm 70, a strip 82 of insulation material interposed between arms 70 and 78, and a connector strip 84 which is received on lug 72. The connector strip 84 follows the contour of wall 46 and is secured adjacent the other end thereof to the wall by a contact rivet 86. The strip 82 electrically separates the mounting ends of the spring arms 78 and 70, and the arms 70 and 84 are electrically connected together but separated from the rivet 80 and arm 78 by the boss 72 of flange 52. Arm 70 is normally biased to the left so that the flange 74 thereof is held in engagement with the lug 64. Likewise, arm 78 is also normally biased to the left so that the contact 76 engages the contact 60.

Switch 45 is mounted on the striker 24 by having the ribbed flange 54 thereof wedged within a shallow recess 88 opening to recess 38 and by having the ribbed flange 52 thereof, and the arms 78 and 70, connector strip 84 and strip 82 secured thereto, wedged within a recess 90 which also opens to the recess 38. As shown in FIGURE 4, a lanced tab 92 of arm 78 ensures electrical connection between the switch 45 and the striker 24 which is ground.

The switch is shown in position in FIGURE 3 when the tail gate is in an open position and in this position it will be noted that a circuit is completed from the contact 56 to ground across the connector strip 58, the contacts 60 and 76, the spring arm 78, and the striker 24. Thus, as shown in FIGURE 5, the enabling circuit from the battery 94 across the courtesy light 26, which is connected to the contact 56, can be completed at will by closing the switch 96.

When the tail gate is in a closed position, the bolt housing 28 moves the plunger 44 to the right of the striker 24, as shown in FIGURE 2, to move the arm 78 to the right so that the contact 76 thereof engages the contact 68 of the arm 70. Arm 70 will also be moved to the right, with the movement being limited by engagement of contact 68 with strip 66 which is backed up by contact 56. In this position, the enabling circuit from the battery 94 across the window regulator motor 98 can be completed at will by switch 100 since contact 86 is connected to ground across strip 84, arm 70, contacts 68 and 76, arm 78, and the striker 24.

Thus, the selector switch selectively and alternately enables and disables the window regulator motor circuit or the courtesy light circuit in accordance with the position of the tail gate 14.

What is claimed is:

1. The combination comprising, a vehicle body having a closure movable between open and closed positions with respect to said body, a window mounted on said closure for movement between open and closed positions with respect thereto, power operating means for said window, light means mounted on said body, a source of power, separate circuit means connecting said power operating means and said light means across said source of power, and selector switch means operated by said closure for selectively enabling said light circuit means when said closure is in open position and selectively enabling said power operating circuit means when said closure is in closed position, said selector switch means disabling said light circuit means when said power operating circuit means is enabled and disabling said power operating circuit means when said light circuit means is enabled to prevent operation of said window unless said closure is in closed position.

2. A selector switch comprising, in combination, a switch base, a contact mounted on said base, first and second switch arms mounted on said base adjacent one end thereof, means biasing said first arm into engagement with said contact, means biasing said second arm toward said first arm, means on said second arm overlapping said first arm and engageable with means on said base to normally hold said second arm out of engagement with said first arm, and means engageable with said first arm to move said first arm into engagement with said second arm and move said arms as a unit to move said second arm out of engagement with said base.

3. A selector switch comprising, in combination, a switch base, a contact mounted on said base, first and second switch arms commonly mounted on said base adjacent one end thereof, means electrically insulating said arms adjacent their mounted ends, means biasing said first arm into engagement with said contact, means biasing said second arm toward said first arm, flange means on said second arm overlapping said first arm and engageable with said base to normally hold said second arm out of engagement with said first arm, and means engageable with said first arm to move said first arm past said flange means and into engagement with said second arm to move said arms as a unit and move said flange means out of engagement with said base.

4. The combination comprising, a lock striker including a generally C-shaped portion defining a latch receiving housing and including a leg portion, a recess in said leg portion, a switch housing mounted within said recess, a contact mounted on said switch housing, first and second switch arms mounted adjacent one end thereof on said switch housing, means normally biasing said first arm into engagement with said contact, means biasing said second arm toward said first arm, cooperating means on said second arm and said switch housing normally holding said second arm out of engagement with said first arm, and means mounted on said leg and actuated by latch means adapted to be received within said latch receiving housing to move said first arm out of engagement with said contact and into engagement with said second arm and move said arms as a unit relative to said contact.

5. The combination comprising, a lock striker including a generally C-shaped portion defining a latch receiving housing and including a leg portion, a first recess in said leg portion, a pair of oppositely opening second recesses opening to said first recess, a switch housing having flange means respectively received within said second recesses, a contact mounted on said housing, first and second switch arms mounted adjacent one end thereof on one of said flange means, means normally biasing said first arm into engagement with said contact, means biasing said second arm toward said first arm, cooperating means on said second arm and said switch housing normally holding said second arm out of engagement with said first arm, and means mounted on said leg and actuated by latch means adapted to be received within said latch receiving housing to move said first arm out of engagement with said contact and into engagement with said second arm and move said arms as a unit relative to said contact.

6. The combination comprising, a vehicle body having a closure movable between open and closed positions with respect to said body, latching means mounted on said closure, striker means mounted on said body and engageable with said latching means to retain said closure in closed position, a window mounted on said closure for movement between open and closed positions with respect thereto, power operating means for said window, light means mounted on said body, a source of power, separate circuit means connecting said power operating means and said light means across said source of power, and selector switch means mounted on said striker means and operated by said latching means upon engagement of said latching means with said striker means for selectively enabling said power operating light circuit means and disabling said light circuit means when said closure is in closed position.

7. The combination comprising, a vehicle body having a closure movable between open and closed positions with respect to said body, latching means mounted on said closure, striker means mounted on said body and engageable with said latching means to retain said closure in closed position, first and second electrically operated means mounted on said body, a switch housing mounted on said striker means and including spaced first and second contacts, first and second switch arms mounted on said housing, means normally biasing said first arm into engagement with said first contact, means normally locating said second arm out of engagement with said first arm and said second contact, switch operating means mounted on said striker means and operated by engagement of said latching means with said striker means to move said first arm out of engagement with said first contact and into engagement with said second arm to move said arms as a unit into engagement with said second contact, a source of power, first control circuit means connecting said first electrically operated means across said source of power and including said first contact and said first switch arm, second control circuit means connecting said second electrically operated means across said source of power and including said first and second switch arms and said second contact, said first circuit means being enabled when said closure is in open position and said second circuit means being enabled when said closure is in closed position.

References Cited in the file of this patent

UNITED STATES PATENTS

| | | |
|---|---|---|
| 1,758,523 | Kertz | May 13, 1930 |
| 2,674,334 | Uberbacher | Apr. 6, 1954 |
| 2,740,947 | Davies | Apr. 3, 1956 |
| 2,793,907 | Hess et al. | May 28, 1957 |
| 2,893,727 | Barnard | July 7, 1959 |

UNITED STATES PATENT OFFICE

CERTIFICATE OF CORRECTION

Patent No. 3,125,371                  March 17, 1964

Alfred E. Krueger

It is hereby certified that error appears in the above numbered patent requiring correction and that the said Letters Patent should read as corrected below.

In the grant, lines 1 to 3, for "Alfred E. Krueger, of Detroit, Michigan," read -- Alfred E. Krueger of Detroit, Michigan, assignor to General Motors Corporation, of Detroit Michigan, a corporation of Delaware, --; line 12, for "Alfred E. Krueger, his heirs" read -- General Motors Corporation, its successors --; in the heading to the printed specification, line 3, for "Alfred E. Krueger, 15862 Linnhurst, Detroit 5, Mich." read -- Alfred E. Krueger, Detroit, Mich., assignor to General Motors Corporation, Detroit, Mich., a corporation of Delaware --.

Signed and sealed this 4th day of August 1964.

(SEAL)
Attest:

ERNEST W. SWIDER                         EDWARD J. BRENNER
Attesting Officer                     Commissioner of Patents